US009599633B2

(12) United States Patent
McKown

(10) Patent No.: US 9,599,633 B2
(45) Date of Patent: Mar. 21, 2017

(54) MOUNTING ANGLE CALIBRATION FOR AN IN-VEHICLE ACCELEROMETER DEVICE

(71) Applicant: Guardity Technologies, Inc., Plano, TX (US)

(72) Inventor: Russell Carl McKown, Richardson, TX (US)

(73) Assignee: GUARDITY TECHNOLOGIES, INC., Plano, TX (US)

( * ) Notice: Subject to any disclaimer, the term of this patent is extended or adjusted under 35 U.S.C. 154(b) by 955 days.

(21) Appl. No.: 13/907,887

(22) Filed: Jun. 1, 2013

(65) Prior Publication Data

US 2013/0332105 A1    Dec. 12, 2013

Related U.S. Application Data

(60) Provisional application No. 61/658,556, filed on Jun. 12, 2012.

(51) Int. Cl.
*G01P 15/18*  (2013.01)
*G01P 21/00*  (2006.01)

(52) U.S. Cl.
CPC .............. *G01P 15/18* (2013.01); *G01P 21/00* (2013.01)

(58) Field of Classification Search
CPC combination set(s) only.
See application file for complete search history.

(56) References Cited

U.S. PATENT DOCUMENTS

| 6,782,315 B2 * | 8/2004 | Lu ...................... B60G 17/0185 180/271 |
| 9,024,739 B2 * | 5/2015 | McKown ................. B60Q 5/00 340/384.73 |
| 2004/0044477 A1 * | 3/2004 | Jung ...................... G01C 21/30 702/5 |

(Continued)

OTHER PUBLICATIONS

Milan B. Vukajlovi, Srdjan Tadic and Dejan M Dramicanin, The Practical Design of In-vehicle Telematics Device with GPS and MEMS Accelerometers, Serbia, Belgrade, Nov. 22-24, 2011, 19th Telecommunications forum TELFOR 2011.

(Continued)

*Primary Examiner* — Huan Tran

(57) ABSTRACT

The present application provides a system, method and non-transitory computer readable medium for mounting angle estimation and compensation for in-vehicle devices with an accelerometer sensor. In example embodiments, a two phased calibration starts with the vehicle parked on a horizontal surface and uses averaging to obtain mean value estimates of the force due to gravity on each directly coupled accelerometer sensor axis. These mean value estimates are used to perform an axes reassignment, if necessary, and to estimate the pitch and roll mounting angles. The calibration is completed by estimating the yaw mounting angle while the vehicle is driven. The yaw estimate is based on acceleration data in the vehicle's x-y plane that is accumulated when the amplitude is above a threshold. The accumulation includes a sign change if forward deceleration is indicated. Calibration provides a coordinate transformation matrix that is used during device operation to transform the sensor data into the standard vehicle body coordinates for subsequent device-dependent application processing.

20 Claims, 8 Drawing Sheets

(56) References Cited

U.S. PATENT DOCUMENTS

2009/0254279 A1* 10/2009 Han .................. G01C 21/16
  701/501
2015/0232024 A1*  8/2015 McKown .............. G10K 9/18
  340/425.5

OTHER PUBLICATIONS

Paul D Groves, Principals of GNSS, Inertial, and Multisensor Integrated Navigation Systems, SOFTbank E-Book Center Tehran, © 2008.

Eric Vinande, Penina Axelrad, Dennis Akos, Mounting-Angle Estimation for Personal Navigation Devices, IEEE Transactions on Vehicular Technology, vol. 59, No. 3, Mar. 2010.

* cited by examiner

Example of OBDII Telematics
Device with 3-axis Accelerometer

FIG. 4 — First Phase

FIG. 5

Axes Reassignment Table

| k | Bx | By | Bz | Comment |
|---|----|----|----|---------|
| +1 | Az | Ay | -Ax | x-axis up, large positive Θ = upward pitch |
| -1 | -Az | Ay | Ax | x-axis down, large negative Θ = downward pitch |
| +2 | Ax | Az | -Ay | y-axis up, large negative φ = left roll |
| -2 | -Az | Ay | Ax | y-axis down, large positive φ = right roll |
| 3 | Ax | -Ay | -Az | z-axis is pointing up |
| -3 | Ax | Ay | Az | z-axis is pointing down as desired |

MOUNTING ANGLE CALIBRATION FOR AN IN-VEHICLE ACCELEROMETER DEVICE

CROSS-REFERENCE TO RELATED APPLICATIONS

This application claims priority to U.S. provisional application No. 61/658,556, entitled "Mounting Angle Calibration for an In-vehicle Accelerometer Device", dated Jun. 12, 2012. This application is related to application Ser. No. 13/276,991, entitled "Detecting a Transport Emergency Event and Directly Enabling Emergency Services", filed on Oct. 19, 2011, and application Ser. No. 13/907,880 entitled "Qualifying Automatic Vehicle Crash Emergency Calls to Public Safety Answering Points", filed on even date herewith, and application Ser. No. 13/907,883 entitled "Qualifying Automatic Vehicle Crash Emergency Calls to Public Safety Answering Points", filed on even date herewith, and application Ser. No. 13/907,885 entitled "Horn Input to In-Vehicle Devices and Systems", filed on even date herewith, and application Ser. No. 13/907,889 entitled "Automatic Speech Message Validation of an Emergency Teletype Text Message", filed on even date herewith. The contents of which are hereby incorporated by reference in their entireties.

FIELD OF THE APPLICATION

The present application relates to in-vehicle devices that contain accelerometers; and more particularly, mounting angle estimation and compensation for in-vehicle devices containing a multiple axis accelerometer sensor.

BACKGROUND OF THE APPLICATION

In-vehicle accelerometer devices refer to devices that are installed somewhere on or in a vehicle and contain accelerometers. Personal navigation (PN) devices and automatic crash notification (ACN) devices are examples of in-vehicle devices that may contain a multiple axis accelerometer sensor. These in-vehicle accelerometer devices may either come with the vehicle from the factory or be installed aftermarket, e.g., by the vehicle owner or a technician. Although factory installed devices typically have known accelerometer/device mounting angles relative to standard vehicle body axes, the aftermarket in-vehicle accelerometer devices may end up with mounting angles that are unknown to the manufacturer of said device. These aftermarket in-vehicle accelerometer devices may consequently need a system and method for estimating the accelerometer/device-to-vehicle mounting angles so that the accelerometer sensor data can be transformed into the standard vehicle body coordinates to allow a standard analysis of the orientation sensitive data.

A very accurate accelerometer sensor-to-vehicle-body coordinate transformation may be required, for example, for aftermarket PN devices to function at an intended high level of performance. Some personal navigation devices use multiple axis accelerometers and gyroscopes to enable an inertial navigation assist to GPS navigation. The combined inertial and GPS navigation mode provides better location information when going through areas of poor GPS signal reception. Accurate coordinate transformation is required since navigation with accelerator-only inertial clusters has the property that errors in acceleration are twice integrated into errors in position—a process that exponentially amplifies the errors. Mounting angle estimation techniques appropriate for aftermarket PN devices is discussed by Eric Vinande, Penina Axelrad, and Dennis Akos in the article, "*Mounting-Angle Estimation for Personal Navigation Devices*", IEEE Transactions on Vehicular Technology, Vol. 59, No. 3, March 2010. The techniques presented use GPS for determining forward or rearward vehicle acceleration and vehicle orientation and are capable of estimating the pitch, roll and yaw mounting angles to accuracies within 2 degrees. This accuracy allows a 'reasonable' 10 second inertial navigation to have a 9 meter error. We again note that the nature of this type of inertial navigation for GPS coverage gaps is that the errors will grow exponentially without a timely 'truth' reference such as an independent GPS location estimate.

Other in-vehicle accelerometer devices, may function fine with less accurate accelerometer sensor-to-vehicle-body coordinate transformations. Aftermarket ACN devices, for example, may fundamentally only be required to identify the 'crash impact angle' to within an angular quadrant, i.e., to identify the direction of the collision impact as being from the 'front', 'passenger's side', 'rear' or 'driver's side' of the vehicle. This limited resolution crash impact angle estimation requirement for some ACN devices allows the mounting angle estimation errors for those ACN devices to be greater than the 2 degrees or so that are associated with the PN devices. Generally, in-vehicle accelerometer devices that do not use the accelerometer data for inertial navigation will have less stringent requirements for mounting angle estimation errors than those that do.

A problem with the mounting angle estimation techniques described by Vinande et al. is that since they are focused on aftermarket PN devices, they assume the availability of a functioning GPS location subsystem in the device and impose processing requirements on the use of the GPS location data for the purpose of angle estimation. The GPS data is used to estimate accelerations, horizontal road conditions and to determine appropriate times for the pitch and roll phase and the subsequent yaw phase of the angle estimation methods. Mounting angle estimation procedures that do not require a GPS unit are also desired for in-vehicle accelerometer devices.

Another problem with known mounting angle estimation methods is that the accelerometer/device and vehicle body reference axes are assumed to be favorably oriented for the equations used to estimate the angles. An automatic means of detecting unfavorable device accelerometer axes assignments and performing axes reassignment is desired to improve the accuracy of the mounting angle estimations.

What would be optimal is for the mounting angle estimation and compensation methods for in-vehicle accelerometer devices to be conducted without being dependent on the presence of a GPS subsystem and are capable of automatic reassignment of the accelerometer axes for devices with unfavorable orientations.

SUMMARY OF APPLICATION

The present application utilizes an ACN telematics device that plugs into a vehicle's diagnostic connector and uses accelerometer sensor data to perform automatic crash detection and analysis. Although the On-Board Diagnostics version 2 (OBDII) connector is mandated to always be near the vehicle steering column, the exact location and orientation varies significantly between vehicles. Therefore the ACN device needs a method of mounting angle estimation and compensation that is robust with respect to device axes orientation. In general, in-vehicle devices that contain an accelerometer sensor need reliable and device-appropriate methods to transform the sensor data into standard vehicle body coordinates. As such, the present application provides a system, method and non-transitory computer readable medium for mounting angle estimation and compensation for in-vehicle devices with an accelerometer sensor. In an example embodiment, a two phased calibration starts with the vehicle parked on a horizontal surface and uses averaging to obtain mean value estimates of the force due to gravity on each of 3 orthogonal, directly coupled accelerometer sensor axes. These mean value estimates are used to perform an axes reassignment, if necessary, and to estimate the pitch and roll mounting angles. The calibration is then completed by estimating the yaw mounting angle while the vehicle is driven. During this phase, the accelerometer sensor data is transformed into the vehicle's x-y plane by applying the axes reassignment and a coordinate transformation defined by the pitch and roll angles. The yaw estimate is based on acceleration data in the vehicle's x-y plane that is accumulated when the acceleration amplitude is above a threshold. The second phase also inputs additional information from the vehicle to distinguish between forward acceleration and forward deceleration. The completed calibration is summarized in a 3×3 coordinate transformation matrix. During device operation, this matrix is used to transform the 3-axis accelerometer sensor data into the standard 3-axis vehicle body coordinates for subsequent device/application dependent analysis.

For the accelerometer sensor data to be properly analyzed for crash detection and characterization purposes, it is necessary to transform the accelerometer data into the standard vehicle body coordinates that are used for vehicle crash analysis. Other known in-vehicle accelerometer devices, such as PN devices, also require this transformation of the accelerometer sensor data to the standard vehicle body coordinates.

Another example may provide a method that provides receiving accelerometer data generated by a multiple axis accelerometer located inside a motor vehicle, determining a mean value of the accelerometer data on each axis, converting the accelerometer data to a zero mean value for each axis by subtracting the mean value on each axis to create zero mean accelerometer signals, determining an estimate of a pitch angle and a roll angle using the mean value of the accelerometer data on each axis, and rotating the zero mean accelerometer signal to an X-Y plane by using the estimated pitch angle and the estimated roll angle and, while the vehicle is driven for a driving event period, detecting an acceleration/deceleration driving event period based on an amplitude of acceleration in the X-Y plane.

Yet another example may provide an apparatus that includes a receiver configured to receive accelerometer data generated by a multiple axis accelerometer located inside a motor vehicle, and a processor configured to determine a mean value of the accelerometer data on each axis, convert the accelerometer data to a zero mean value for each axis by subtracting the mean value on each axis to create zero mean accelerometer signals, determine an estimate of a pitch angle and a roll angle using the mean value of the accelerometer data on each axis, and rotate the zero mean accelerometer data to an X-Y plane by using the estimated pitch angle and the estimated roll angle and, while the vehicle is driven for a driving event period, detecting an acceleration/deceleration driving event period based on an amplitude of acceleration in the X-Y plane.

Still yet another example may provide a non-transitory computer readable storage medium configured to store instructions that when executed cause a processor to perform receiving accelerometer data generated by a multiple axis accelerometer located inside a motor vehicle, determining a mean value of the accelerometer data on each axis, converting the accelerometer data to a mean value for each axis by subtracting the mean value on each axis to create zero mean accelerometer signals, determining an estimate of a pitch angle and a roll angle using the mean value of the accelerometer data on each axis, and rotating the zero mean accelerometer data to an X-Y plane by using the estimated pitch angle and the estimated roll angle and, while the vehicle is driven for a driving event period, detecting an acceleration/deceleration driving event period based on an amplitude of acceleration in the X-Y plane.

BRIEF DESCRIPTION OF THE DRAWINGS

FIG. 5 is an axes reassignment table that is associated with the first phase of calibration processing of an example embodiment of the application.

DETAILED DESCRIPTION OF THE APPLICATION

The present application provides a system and method for mounting angle estimation and compensation for in-vehicle devices with an accelerometer sensor wherein the methods are not dependent on the presence of a GPS subsystem and are capable of automatic reassignment of the accelerometer axes for devices with unfavorable orientations. The detailed description of an example embodiment illustrates the two phases of calibration. In the first phase the vehicle is parked on a horizontal surface and the force due to gravity is used to perform an axes reassignment, if necessary, and to estimate the pitch and roll mounting angles. In the second phase the vehicle is driven and the yaw angle is estimated using accelerometer data that is transformed into the vehicle's x-y plane by applying the results of the first phase and some additional vehicle-derived information.

Figure 1:
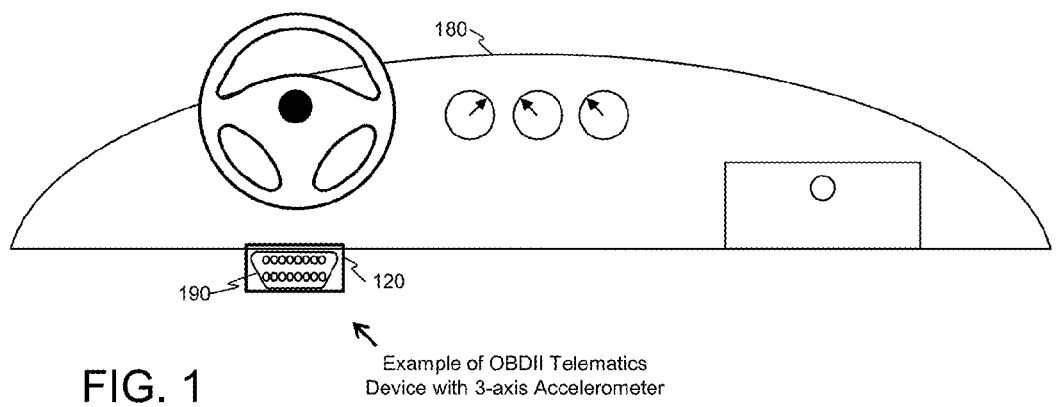
FIG. 1 illustrates an example of an in-vehicle device that attaches to a vehicle's OBDII connector.

FIG. 1 illustrates a vehicle dash 180 with an example in-vehicle ACN device 120 that attaches to the vehicle's OBDII connector 190. In this example, the ACN device 120 has an enclosure with an integrated standard OBDII male connector so that it may directly plug into the vehicle's OBDII female connector 190, without the need for a connecting cable. The orientation of the accelerometer sensor in the ACN device consequently depends on the orientation of the vehicle's OBDII connector which varies with the vehicle manufacturer, model and year. In an example embodiment of the present application, the mounting angle estimation and compensation transforms the accelerometer sensor data of this OBDII mounted ACN device into the standard vehicle body coordinates so the vehicle crash analysis can be performed as required.

Figure 2:
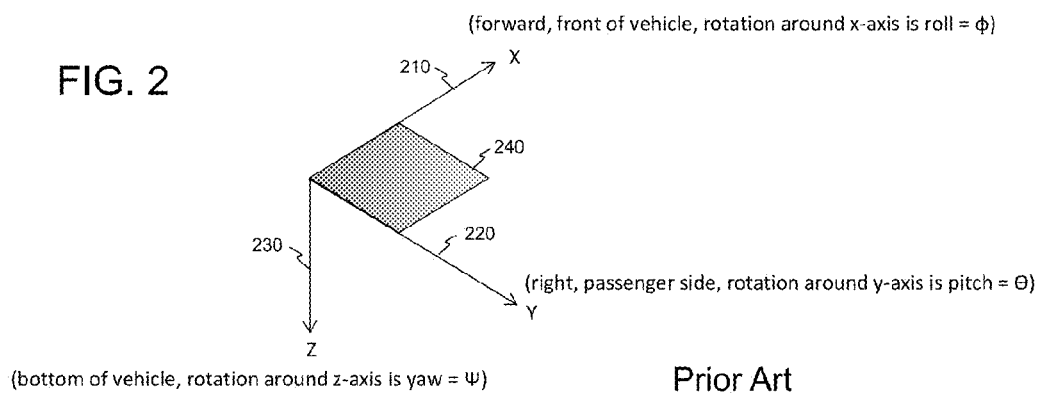
FIG. 2 is a diagram of the standard vehicle body coordinates.

FIG. 2 is a diagram of the standard vehicle body coordinates. The x-axis 210 points forward to the front of the vehicle and a clockwise rotation (of the accelerometer sensor axes in the in-vehicle device) around the x-axis (in the direction it points) is measured by a positive roll angle φ. The y-axis 220 points to the passenger side of the vehicle and a clockwise rotation around the y-axis is measured by a positive pitch angle θ. The z-axis 230 points to the bottom of the vehicle and a clockwise rotation around the z-axis is measured by a positive yaw angle Ψ. A rectangular patch of the vehicle x-y plane 240 is also shown in FIG. 2.

Figure 3:
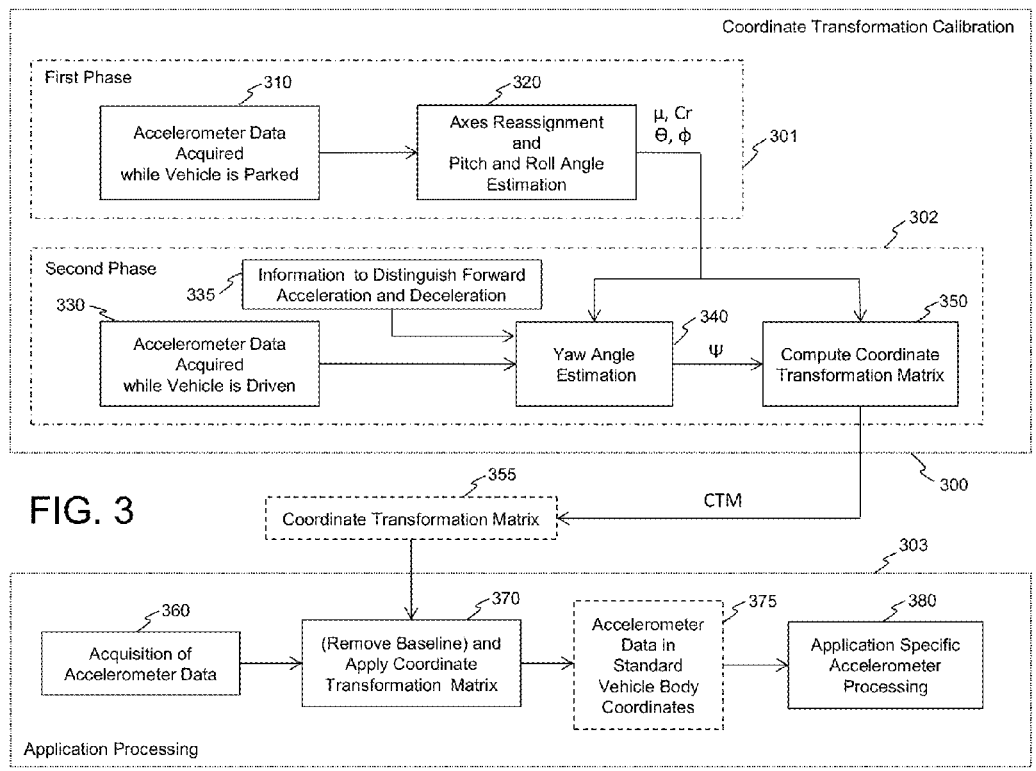
FIG. 3 is a diagram of an example embodiment of the application that indicates a coordinate transformation matrix is determined by calibration processing and is used by application specific processing.

FIG. 3 shows a block diagram of an example embodiment of the present application of the mounting angle estimation and compensation for an in-vehicle accelerometer device. The Coordinate Transformation Calibration 300 contains a First Phase 301 which processes Accelerometer Data Acquired while the Vehicle is Parked 310 and a Second Phase 302 which processes Accelerometer Data Acquired while Vehicle is Driven 330. The output of the Coordinate Transformation Calibration 300 is the Coordinate Transformation Matrix 355 which is input to the device/application specific Application Processing 303.

Referring to FIG. 3, in an example embodiment, the First Phase 301 of the Coordinate Transformation Calibration 300 may occur only once as part of the in-vehicle accelerometer device installation. Furthermore, in an example embodiment, the First Phase 301 may only occur after the installer or user has parked the vehicle on a horizontal surface so that the force due to gravity is approximately lined up with the vehicle body z-axis. The installer or user may be instructed of this procedure, for example, by reading the device User Manual or Quick Start documentation, listening to voice prompts produced by an audio subsystem of the in-vehicle device or other audio or visual means. In this example embodiment, once the vehicle is so parked, the First Phase 301 may be activated to input acquired accelerometer data 310 to the Axes Reassignment and Pitch and Roll Angle Estimation module 320.

Note that in some embodiments, the Coordinate Transformation Calibration 300 may also be reactivated at a later time in the same manner as during the device installation. In other embodiments, an additional background task version of the calibration may exist with no requirement for the user-driver to be aware of this later additional calibration activity. In still other embodiments, the background task embodiment may be the only calibration. The support for these different embodiments is provided by modifications to the averaging procedures of the calibration methods. In the example embodiment discussed, the installer or user-driver is involved to obtain a faster calibration, for example, to ensure that the vehicle is parked on a level, i.e., horizontal, surface during the First Phase 301 of FIG. 3. In the background task calibration embodiments, the data may be averaged over a much longer period of time while either driving or parked to average out the effect of roads with slopes.

Figure 4:
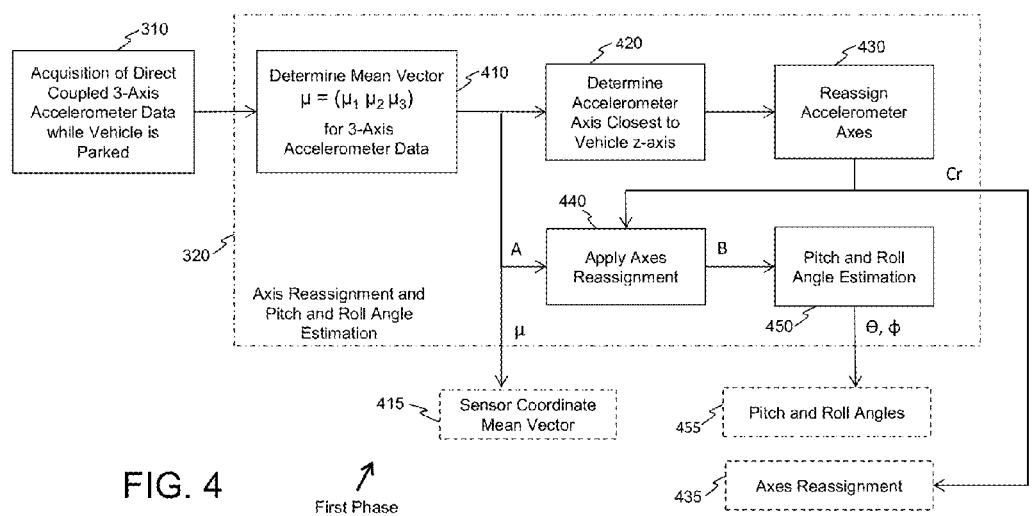
FIG. 4 is a diagram of processing performed in the first phase of calibration processing of an example embodiment of the application.

Referring to FIG. 4, in an example embodiment of the present application, the Axes Reassignment and Pitch and Roll Angle Estimation module 320 contains a module 410 which determines a 3 element Mean Vector, $\mu=(\mu_1 \mu_2 \mu_3)$, where $\mu_m$ for m=1, 2 or 3 is an estimate of the mean of the data from the $m^{th}$ axis of the 3-axis accelerometer sensor. The averaging to estimate the mean may nominally be over several seconds. In this notation m=1 represents the accelerometer sensor x-axis, m=2 represents the accelerometer sensor y-axis and m=3 represents the accelerometer sensor z-axis. In this example embodiment, module 420 inputs the Mean Vector µ, and determines which of the 3 accelerometer axes is closest in orientation to the vehicle body z-axis. Module 420 provides input to the Reassign Accelerometer Axes module 430. The sensor coordinate axes may be reassigned in order to protect the Pitch and Roll Angle Estimation 450 from numerical problems that arise when the accelerometer sensor coordinate orientation is extreme relative to the vehicle body coordinates. One example of such extreme orientations is when the accelerometer sensor x-axis is parallel to or nearly parallel to the vehicle body z-axis.

Module 420, Determine Accelerometer Axis Closest to Vehicle z-axis, may, for example, determine the element of µ with the largest absolute value and set a process control index k as follows:

k=sign ($\mu_j$*j; where j identifies the axis with the maximum absolute value of
µ, i.e., such that $|\mu_j|$=max ($|\mu|$).

This definition provides that k=±1, ±2 or ±3 in a manner that captures the information of which axis and axis direction of the 3-axis accelerometer sensor is closest to being aligned with the force due to gravity. The term "force due to gravity" is used herein to mean the force that opposes gravity and keeps us from falling. Provided that the vehicle is level, i.e., it is parked on a horizontal surface as instructed, this force points up to the zenith along the negative z-axis of the standard vehicle body coordinates in FIG. 2.

Continuing to refer to FIG. 4, the reassign accelerometer axes module 430 inputs the information regarding the accelerometer axis nearest to vehicle z-axes from module 420 and reassigns the accelerometer axes definitions based on that input. For example, given the above process control index k=±1, ±2 or ±3, reassignment of the 3 accelerometer axes can be as defined in the Axes Reassignment Table in FIG. 5. If k=+1 for example, the accelerometer axes would be redefined such that Bx=Az
By=Ay
Bz=−Ax; where the "A" indicates the original accelerometer sensor axes and the "B" indicates the new axes assignments. The "A" original accelerometer sensor axes definitions are defined by the sensor manufacturer and typically label the sensor data outputs. Note that k=+1 occurs when: 1) the accelerometer sensor x-axis contains the mean estimate with the largest absolute value and 2) this x-axis mean estimate is positive. As indicated in the comment column of the Axes Reassignment Table in FIG. 5, this occurs when the original sensor x-axis is pointed up (more vertical than horizontal) relative to the vehicle body x-axis 210 or x-y plane 240. In vector-matrix notation, this example accelerometer axes reassignment can be written as B=Cr*A where the new accelerometer vector is B=[Bx, By, Bz]', the original accelerometer sensor vector is A=[Ax, Ay, Az]' and the axes reassignment matrix is Cr=[0, 0, 1; 0, 1, 0; −1, 0, 0] where prime indicates transpose and semicolon indicates end of row. The Axes Reassignment 435 output of the Reassign Accelerometer Axes module 430 may, for example, be the axes reassignment matrix Cr or just the process control index k given the availability of the Axes Reassignment Table in FIG. 5. The axes reassignment may be efficiently implemented in software using a simple k-dependent 'case' or 'if-then-else' statements without any arithmetic operations. Note that there is no axis reassignment for k=−3, since as commented in FIG. 5, this corresponds to the sensor z-axis pointing down as desired.

Continuing to refer to FIG. 4, the apply axes reassignment module 440 functionally executes ρ=Cr*μ, to obtain a coordinate reassigned mean value vector ρ=(ρ₁ρ₂ρ₃) from the original mean value vector μ=(μ₁μ₂μ₃) determined in module 410. A Pitch and Roll Angle Estimation module 450 inputs ρ and estimates a pitch angle θ and a roll angle φ using known methods. In particular, module 450 computes θ and φ estimates as:

$$\theta = a\tan\{a/\sqrt{(b^2+c^2)}\}$$

$$\phi = a\tan 2\{-b,-c\};$$

where: $a=\rho_1$, $b=\rho_2$ and $c=\rho_3$; a tan is the arctangent function and a tan 2 is the four-quadrant arctangent function; / is the division operator and $\sqrt{(\ )}$ is the square root function. These estimates for θ and φ are output as Pitch and Roll Angles 455 in FIG. 4, completing the First Phase 301 of Coordinate Transformation Calibration 300 in FIG. 3.

Referring to FIG. 3, in an example embodiment, the second phase 302 of the coordinate transformation calibration 300 may also occur only once in association with the in-vehicle accelerometer device installation. Furthermore, in an example embodiment, the second phase 302 may occur while or after the vehicle is driven for a period of time that may vary (for example, from many seconds to several minutes to several tens of minutes). The device installer or user-driver may be informed of this procedure, for example, by reading the device User Manual or Quick Start documentation or listening to voice prompts produced by an audio subsystem of the in-vehicle device. As previously noted in other embodiments, the calibration 300 may be performed as a background task that executes along with the Application Processing 303 without any requirement for the user-driver to be aware of this later additional calibration activity. The disadvantage of using the calibration as background task embodiments is the greater time required to complete calibration.

Continuing to refer to FIG. 3, the Second Phase 302 processes 3-axis accelerometer data that is acquired while the vehicle is being driven. The Yaw Angle Estimation module 340 inputs accelerometer data from the Accelerometer Data Acquired while Vehicle is Driven module 330, Information to Distinguish Forward Acceleration and Deceleration 335, and the Axes Reassignment 435, and then processes these inputs to determine a yaw angle Ψ estimate. The Compute Coordinate Transformation Matrix module 350 inputs the Axes Reassignment 435, the Pitch and Roll Angles 455 and the yaw angle Ψ estimate from module 340. Module 350 then uses these inputs to determine a Coordinate Transformation Matrix 355, completing the processing of the Coordinate Transformation Calibration 300.

Figure 6:
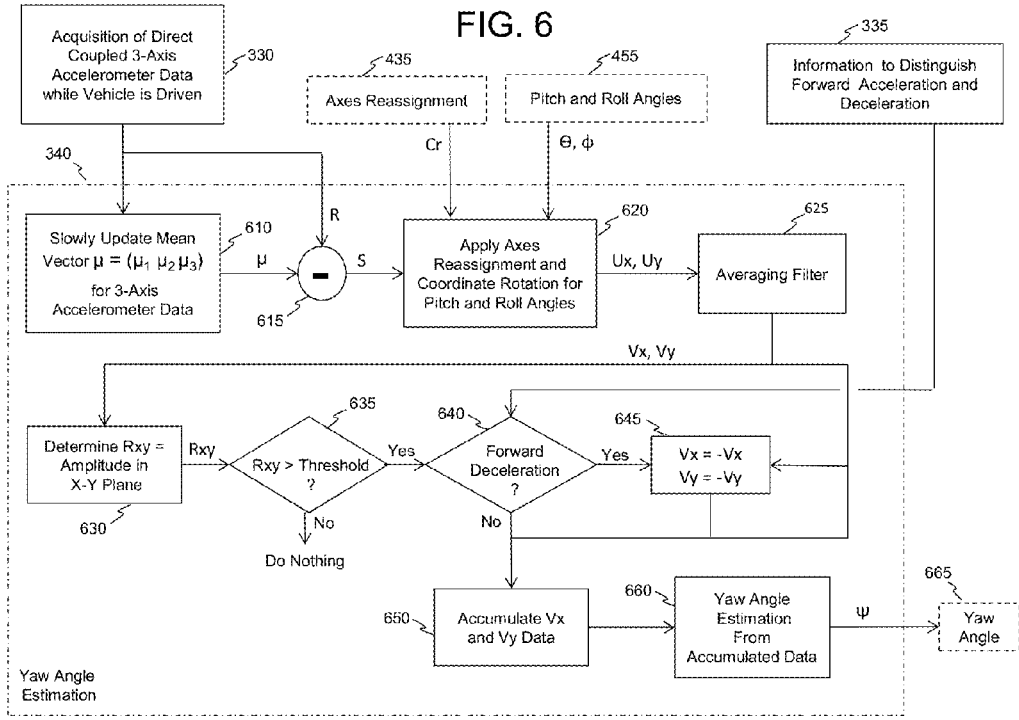
FIG. 6 is a diagram of processing performed in the second phase of calibration processing of an example embodiment of the application.

FIG. 6 shows a block diagram of an example embodiment of the Yaw Angle Estimation module 340 of the present application. In this embodiment, the Yaw Angle Estimation module 340 contains a module 610 which inputs accelerometer data from the Accelerometer Data Acquired while Vehicle is Driven module 330 and slowly updates the current estimate of the 3 element mean vector, μ=(μ₁μ₂μ₃). This mean vector μ is initially provided as Sensor Coordinate Mean Vector 415 determined in the Determine Mean Vector module 410 of the First Phase 301 calibration processing. The time constant of the slow update, i.e., the integration time, of the estimates of the means of the 3-axis accelerometer data is on the order of 1 minute so that the subtraction 615 of μ from the accelerometer sensor data R passes any driver induced vehicle acceleration and deceleration events that occur in times that are on the order of 5 seconds.

Continuing to refer to FIG. 6, after the subtraction of the means 615, the accelerometer data is processed by Apply Axes Reassignment and Coordinate Rotation for Pitch and Roll Angles module 620 which applies the Axes Reassignment 435 and the coordinate rotation for the Pitch and Roll Angles 455. The application of the axes reassignment can be written as T=Cr*S where S=[Sx, Sy, Sz]' is the 3-axis accelerometer data at the output of the subtraction 615, Cr is the axes reassignment matrix discussed above as determined by the First Phase processing 301 and T=[Tx, Ty, Tz]' is zero mean accelerometer data in the reassigned coordinates. The application of the coordinate transformation for the First Phase 301 estimated pitch and roll angles can be written as U=Csb*T where U=[Ux, Uy, Uz]' is 3-axis accelerometer data and Csb is the sensor-to-body coordinate transformation matrix assuming a zero yaw angle, Ψ=0. As is well known, the sensor-to-body coordinate transformation matrix Csb=Cbs' which is the transpose of the body-to-sensor coordinate transformation matrix Cbs. The standard convention is made that the yaw Ψ rotation occurs first, followed by the pitch θ and roll φ rotations. For Ψ=0, the 3×3 matrix Cbs can be written as:

Cbs(Ψ=0, θ, φ)=[cθ, 0, −sθ; sφsθ, cφ, sφsθ; cφsθ, −sφ, cφcθ]; where cθ=cos(θ), sθ=sin(θ), etc., multiplication is implied and semicolon indicates end of row. Note Uz is the acceleration component along the z-axis of the vehicle body coordinates independent of the true value of yaw angle Ψ. (This is evident from inspection of the 3$^{rd}$ row of Csb which equals the 3$^{rd}$ column of Cbs. For arbitrary Ψ, θ, φ we note Cbs(:,3)=[−sθ, sφcθ, cφcθ]' independent of φ.) It follows that it is only necessary for module 620 to compute Ux and Uy for the Yaw Angle Estimation 340 of the present application. Ux and Uy have the property that they are only equal to the acceleration along the x and y axis of the vehicle body coordinates if the true value of yaw angle is actually Ψ=0. The data rate of each component of S, T and U may be or is typically the same as the sample rate for each axis of the accelerometer sensor data R from module 230, for example 1000 samples per second.

Continuing to refer to FIG. 6, the Ux and Uy components of U are input to an Averaging Filter 625 that outputs Vx and Vy. This filter improves the signal to noise ratio (SNR) of the driver induced acceleration and deceleration signals and may have a time constant on the order of a few hundred milliseconds. Module 630 in FIG. 6 inputs Vx and Vy and for each sample pair and determines amplitude Rxy of the acceleration vector [Vx Vy] in the x-y plane of the vehicle coordinates. This x-y plane includes the rectangle 240 as drawn in FIG. 2. The value of Rxy may be computed using the exact square root of the sum of the squares formula: Rxy=√(Vx²+Vy²); or approximated without the need for the squaring and square root operations.

Continuing to refer to FIG. 6, in module 635 the sequence of positive scalar Rxy values are each compared to a threshold that is set on the order of 0.5 meter/second² or 0.05 gravitational (g) units so as to detect the driver induced acceleration and deceleration events and exclude typical road noise. If Rxy is not greater than the threshold, then the sampled acceleration data is ignored as indicated by the "Do Nothing" in FIG. 6. If the Rxy value is greater than the threshold, then the Information to Distinguish Forward Acceleration and Deceleration 335 is examined in module 640. If forward deceleration is indicated, then sign of both Vx and Vy are changed in module 645 and the resulting Vx and Vy data are individually accumulated in module 650. Otherwise the Vx and Vy data are individually accumulated in module 650 without a change of sign. The accumulated Vx and Vy data in 650 may be written as ΣVx and ΣVy and in an example embodiment, once the absolute values of ΣVx or ΣVy reach a predetermined threshold, the module 660 may estimate the yaw angle Ψ 665 as: Ψ=a tan 2(ΣVy, ΣVx).

Note that the index notation to identify the individual terms over which the summation Σ is made is omitted for readability, i.e., Vx=Vx (n) and Vy=Vy(n), where "n" is the sample index and the summation is over n for n=1 to N. The number N of terms in the sum may for example, be 10,000 or more depending on the sample rate of Vx and Vy after the Averaging Filter 625 and the number of driver induced acceleration and deceleration events that contribute to the yaw angle estimation.

A key assumption that allows a tan 2(ΣVy, ΣVx) to provide an accurate estimate of the yaw angle Ψ is that the averaging over different driver induced acceleration and deceleration events effectively averages out any acceleration components along the vehicle y-axis. In other words, it is assumed that the lateral acceleration components that arise when the driver is turning left and right tend to cancel in the accumulation of the Vx and Vy data in module 650 that provides ΣVx and ΣVy. For example, this assumption would not be valid for a race car being driven on an oval track. The assumption is observed to be reliable, however, in the context of the present application.

In another example implementation, the accumulation of Vx and Vy data in 650 may include a weighting of individual terms wherein the weight is proportional to the Rxy value that is associated with that Vx and Vy pair. This Rxy-amplitude based weighting on individual terms makes the estimate of the yaw angle Ψ 665 less sensitive to the Rxy threshold. This can be written as: Ψ=a tan 2(Σw*Vy, Σw*Vx); where, for example, w=Rxy and where the Σ represents a summation of all terms. Again, the index notation identifying the individual terms over which the summation is made is omitted for readability, i.e., w=w(n)=Rxy(n).

Referring to FIG. 6 and to FIG. 3, the Information to Distinguish Forward Acceleration and Deceleration module 335 may acquire this information from different sources. One in-vehicle source, for example, is the detection of the driver's use of the vehicle brakes which indicates a forward deceleration. Otherwise, the above threshold Rxy data can be assumed to be associated with forward acceleration. Vehicles have brake pedal sensors and the information is distributed via the vehicle inter-processor data bus, e.g., the CAN bus. Access to the CAN bus may provide the access to the vehicle brake sensor as an embodiment of module 335. Another in-vehicle source for Information to Distinguish Forward Acceleration and Deceleration 335 is vehicle speedometer data which can be mathematically differentiated in time to provide acceleration data, as is well known. Negative values of the differentiated speedometer data indicate forward deceleration whereas positive values of the same indicate forward acceleration. The speedometer data is also distributed via the inter-processor CAN bus and is attractive as data for module 335 since speedometer data is a mandated standard parameter identifier (PID) available at the OBDII diagnostic port. For example, an ACN device mounted to the OBDII connector has an OBDII interpreter function that provides the device with direct access to the vehicle speedometer data. In this example embodiment, module 335 of FIG. 6 would include the OBDII interface, the differentiation of the speedometer data and decision logic to distinguish forward acceleration and deceleration based on whether the differentiated data is positive or negative, respectively.

Figure 7:
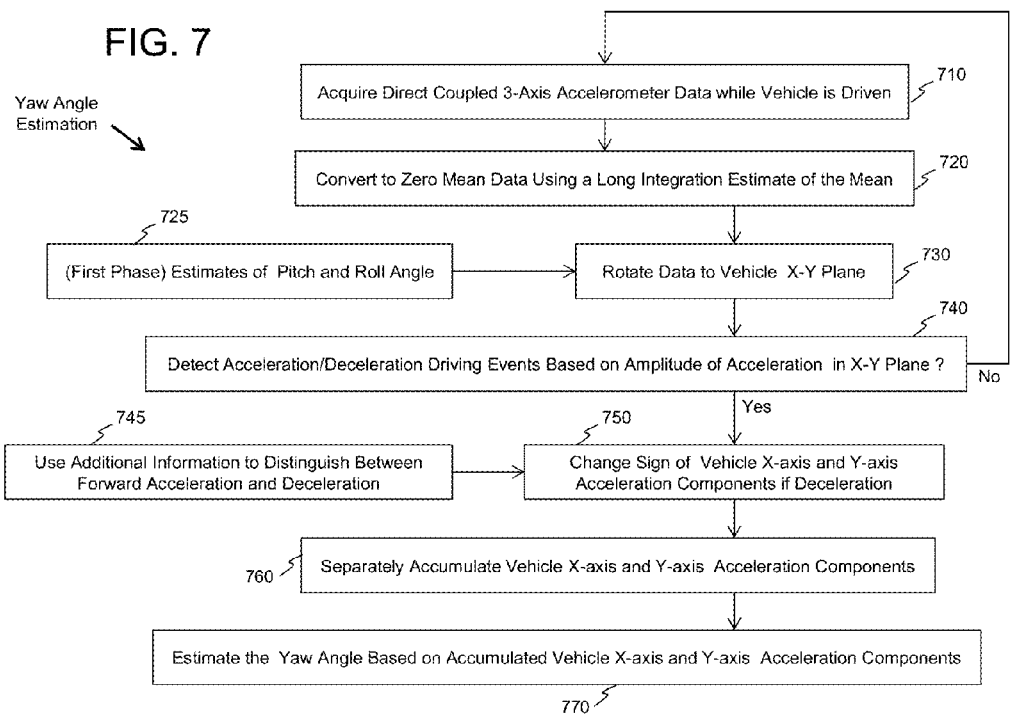
FIG. 7 is a diagram summarizing the method of yaw angle estimation in the second phase of calibration processing of an example embodiment of the application.

FIG. 7 shows a diagram summarizing the method of these example embodiments of the Yaw Angle Estimation module 340 of the present application. Direct coupled 3-axis accelerometer data is acquired while the vehicle is driven 710 and converted to zero mean data in the sensor coordinate system using an effective integration period for the means (~minutes) that is long compared to the driver induced acceleration/deceleration events of interest (~5 seconds) 720. The 3-axis accelerometer data is then rotated to the vehicle x-y plane 730 using the axes reassignment and the pitch and roll angles 725 estimated in the First Phase 301 processing. Acceleration/deceleration driving events are detected based on the amplitude of the acceleration vector in the vehicle x-y plane 740, for example by comparing the amplitude to a threshold, and if no event is detected nothing else is done until more data is acquired in module 710. If an acceleration/deceleration driving event is detected, additional information is used to distinguish a forward acceleration event from a forward deceleration event 745 and if the event is forward deceleration then a sign change is performed on both the x and y components of acceleration in the x-y plane 750. The x and y components of acceleration in the x-y plane are then each accumulated over multiple samples and multiple driving events 760 and when sufficient data has been accumulated, the yaw angle is estimated 770, for example using a four-quadrant arctangent function.

Referring back to FIG. 3, the Compute Coordinate Transformation Matrix 350 inputs the axes reassignment matrix Cr 435, the pitch θ and roll φ angles 455 and the yaw Ψ angle 665 and determines the Coordinate Transformation Matrix 355 that is used by the runtime Application Processing 303. This computation by Module 350 may be written as CTM=Csb*Cr where Csb=Cbs' with prime indicating transpose and where Cbs(Ψ, θ, φ) is the body-to-sensor coordinate transformation matrix as given by the equation below. The 3×3 Cbs matrix can be written as:

$Cbs(\Psi,\theta,\phi)=[c\theta c\Psi, c\theta s\Psi, -s\theta;$ $(s\phi s\theta c\Psi - c\phi s\Psi), (c\phi c\Psi + s\Psi s\theta s\phi), s\phi c\theta;$ $(s\phi s\Psi + c\Psi s\theta c\phi), (c\phi s\theta s\Psi - s\phi c\Psi), c\phi c\theta];$ where cθ=cos(θ), sθ=sin(θ), etc., multiplication is implied and semicolon indicates end of row.

The application processing 303 for this example embodiment is diagramed in FIG. 3. Application Processing 303 includes 3-axis accelerometer data acquisition 360 and a module 370 that removes the mean on each axis and compensates for the mounting angles by multiplying the resulting 3 element accelerometer vector by the above 3×3 coordinate transformation matrix, CTM 355. Module 370 thus provides the accelerometer data in the standard vehicle body coordinates 375 which is suitable for the device/application specific processing of interest 380.

Figure 8:
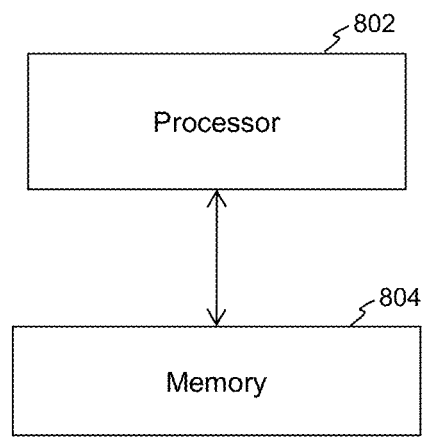
FIG. 8 depicts a diagram of a processor and a connected memory that can be resident on one or more of the devices or modules according to an embodiment of the application.

Note that any reference to an algorithm described or depicted herein is software or a computer program that is run by a processor resident on one or more devices or modules described or depicted herein. FIG. 8 depicts a processor 802 and a connected memory 804 that can be resident on any of the devices described or depicted herein, for example a device implementing the Coordinate Transformation Calibration and Application Processing system presented in FIG. 3, the vehicle dash 180, the in-vehicle ACN device 120, the vehicle's OBDII connector 190 or any other location in or on the vehicle.

A novel method of mounting angle estimation and compensation for in-vehicle devices with a 3-axis accelerometer sensor has been described. The above example embodiments provide procedural details and mathematical relationships that illustrate the application. Several of the individual process modules in both the in the First Calibration Phase processing diagrammed in FIG. 4 and the Yaw Angle Estimation of the Second Calibration Phase processing diagrammed in FIG. 6 may be combined or further distributed. For example in the First Calibration Phase processing of FIG. 4, the Determine Accelerometer Axis Closest to Vehicle z-axis, Reassign Accelerometer Axes, and Apply Axes Reassignment modules may be combined into one or more modules. In the case of one module, the Determine Accelerometer Axis Closest to Vehicle z-axis, Reassign Accelerometer Axes, and Apply Axes Reassignment modules, or the partial or full functionalities of such modules can be combined as a single Axes Reassignment module. Many other embodiments of both the First Calibration Phase processing and the Second Calibration Phase processing should be obvious to one skilled in the art.

The operations of a method or algorithm described in connection with the embodiments disclosed herein may be embodied directly in hardware, in a computer program executed by a processor, or in a combination of the two. A computer program may be embodied on a computer readable medium, such as a storage medium. For example, a computer program may reside in random access memory ("RAM"), flash memory, read-only memory ("ROM"), erasable programmable read-only memory ("EPROM"), electrically erasable programmable read-only memory ("EEPROM"), registers, hard disk, a removable disk, a compact disk read-only memory ("CD-ROM"), or any other form of storage medium known in the art.

An exemplary storage medium (non-transitory storage medium) may be coupled to the processor such that the processor may read information from, and write information to, the storage medium. In the alternative, the storage medium may be integral to the processor. The processor and the storage medium may reside in an application specific integrated circuit ("ASIC"). In the alternative, the processor and the storage medium may reside as discrete components.

Although an exemplary embodiment of the system, method, and computer readable medium of the present application has been illustrated in the accompanied drawings and described in the foregoing detailed description, it will be understood that the application is not limited to the embodiments disclosed, but is capable of numerous rearrangements, modifications, and substitutions without departing from the spirit or scope of the application as set forth and defined by the following claims. For example, the capabilities of the systems can be performed by one or more of the operations or components described herein or in a distributed architecture and may include a transmitter, receiver or pair of both. For example, all or part of the functionality performed by the individual operations, may be performed by one or more of these operations. Further, the functionality described herein may be performed at various times and in relation to various events, internal or external to the operations or components. Also, the information sent between various operations can be sent between the operations via at least one of: a data network, the Internet, a voice network, an Internet Protocol network, a wireless device, a wired device and/or via plurality of protocols. Also, the messages sent or received by any of the operations may be sent or received directly and/or via one or more of the other operations.

One skilled in the art will appreciate that a "system" could be embodied as a personal computer, a server, a console, a personal digital assistant (PDA), a cell phone, a tablet computing device, a smartphone or any other suitable computing device, or combination of devices. Presenting the above-described functions as being performed by a "system" is not intended to limit the scope of the present application in any way, but is intended to provide one example of many embodiments of the present application. Indeed, methods, systems and apparatuses disclosed herein may be implemented in localized and distributed forms consistent with computing technology.

It should be noted that some of the system features described in this specification have been presented as operations, in order to more particularly emphasize their implementation independence. For example, a operation may be implemented as a hardware circuit comprising custom very large scale integration (VLSI) circuits or gate arrays, off-the-shelf semiconductors such as logic chips, transistors, or other discrete components. A operation may also be implemented in programmable hardware devices such as field programmable gate arrays, programmable array logic, programmable logic devices, graphics processing units, or the like.

A operation may also be at least partially implemented in software for execution by various types of processors. An identified unit of executable code may, for instance, comprise one or more physical or logical blocks of computer instructions that may, for instance, be organized as an object, procedure, or function. Nevertheless, the executables of an identified operation need not be physically located together, but may comprise disparate instructions stored in different locations which, when joined logically together, comprise the operation and achieve the stated purpose for the operation. Further, operations may be stored on a computer-readable medium, which may be, for instance, a hard disk drive, flash device, random access memory (RAM), tape, or any other such medium used to store data.

Indeed, a operation of executable code could be a single instruction, or many instructions, and may even be distributed over several different code segments, among different programs, and across several memory devices. Similarly, operational data may be identified and illustrated herein within operations, and may be embodied in any suitable form and organized within any suitable type of data structure. The operational data may be collected as a single data set, or may be distributed over different locations including over different storage devices, and may exist, at least partially, merely as electronic signals on a system or network.

It will be readily understood that the components of the application, as generally described and illustrated in the figures herein, may be arranged and designed in a wide variety of different configurations. Thus, the detailed description of the embodiments is not intended to limit the scope of the application as claimed, but is merely representative of selected embodiments of the application.

One having ordinary skill in the art will readily understand that the application as discussed above may be practiced with steps in a different order, and/or with hardware elements in configurations that are different than those which are disclosed. Therefore, although the application has been described based upon these preferred embodiments, it would be apparent to those of skill in the art that certain modifications, variations, and alternative constructions would be apparent, while remaining within the spirit and scope of the application. In order to determine the metes and bounds of the application, therefore, reference should be made to the appended claims.

While preferred embodiments of the present application have been described, it is to be understood that the embodiments described are illustrative only and the scope of the application is to be defined solely by the appended claims when considered with a full range of equivalents and modifications (e.g., protocols, hardware devices, software platforms etc.) thereto.

What is claimed is:

1. A method comprising:
    receiving accelerometer data generated by a multiple axis accelerometer located inside a motor vehicle;
    determining a mean value of the accelerometer data on each axis;
    converting the accelerometer data to a zero mean signal for each axis by subtracting the mean value on each axis to create zero mean accelerometer signals;
    determining an estimate of a pitch angle and a roll angle using the mean value of the accelerometer data on each axis; and
    rotating the zero mean accelerometer signals to an X-Y plane by using the estimated pitch angle and the estimated roll angle and, while the vehicle is driven for a driving event period, detecting an acceleration/deceleration driving event period based on an amplitude of acceleration in the X-Y plane.

2. The method of claim 1, wherein the multiple axis accelerometer data is 3-axis accelerometer data.

3. The method of claim 1, wherein the converting the accelerometer data to zero mean signals is performed by using an integration estimate of the mean for an integration period of a predefined period of several seconds.

4. The method of claim 1, wherein the driving event period is a predefined number of minutes.

5. The method of claim 1, further comprising:
    comparing the amplitude of acceleration in the X-Y plane to a predetermined threshold to detect the acceleration/deceleration event; and
    if the acceleration/deceleration event is confirmed then determining whether the event is a forward acceleration event or a forward deceleration event.

6. The method of claim 5, wherein if the event is a forward deceleration event then a sign change is applied to both X and Y components of acceleration in the X-Y plane.

7. The method of claim 6, further comprising:
    accumulating a plurality of X and Y components of acceleration in the X-Y plane over a plurality of samples and a plurality of driving events;
    estimating a yaw angle using a four-quadrant arctangent function based on the accumulated X and Y acceleration components; and
    rotating the zero-mean accelerometer signals into the X Y and Z coordinates of the vehicle using the estimated pitch, roll and yaw angles.

8. An apparatus comprising:
    a receiver configured to receive accelerometer data generated by a multiple axis accelerometer located inside a motor vehicle; and
    a processor configured to
        determine a mean value of the accelerometer data on each axis,
        convert the accelerometer data to a zero mean signal for each axis by subtracting the mean value on each axis to create zero mean accelerometer signals,
        determine an estimate of a pitch angle and a roll angle using the mean value of the accelerometer data on each axis, and
        rotate the zero mean accelerometer signals to an X-Y plane by using the estimated pitch angle and the estimated roll angle and, while the vehicle is driven for a driving event period, detecting an acceleration/deceleration driving event period based on an amplitude of acceleration in the X-Y plane.

9. The apparatus of claim 8, wherein the multiple axis accelerometer data is 3-axis accelerometer data.

10. The apparatus of claim 8, wherein the accelerometer data is converted to zero mean signals by using an integration estimate of the mean for an integration period of a predefined period of several seconds.

11. The apparatus of claim 8, wherein the driving event period is a predefined number of minutes.

12. The apparatus of claim 8, wherein the processor is configured to compare the amplitude of acceleration in the X-Y plane to a predetermined threshold to detect the acceleration/deceleration event, and if the acceleration/deceleration event is confirmed then determining whether the event is a forward acceleration event or a forward deceleration event.

13. The apparatus of claim 12, wherein if the event is a forward deceleration event then a sign change is applied to both X and Y components of acceleration in the X-Y plane.

14. The apparatus of claim 13, wherein the processor is further configured to accumulate a plurality of X and Y components of acceleration in the X-Y plane over a plurality of samples and a plurality of driving events, estimate a yaw angle using a four-quadrant arctangent function based on the accumulated X and Y acceleration components, and rotate the zero-mean accelerometer signals into the X Y and Z coordinates of the vehicle using the estimated pitch, roll and yaw angles.

15. A non-transitory computer readable storage medium configured to store instructions that when executed cause a processor to perform:
    receiving accelerometer data generated by a multiple axis accelerometer located inside a motor vehicle;
    determining a mean value of the accelerometer data on each axis;
    converting the accelerometer data to a zero mean signal for each axis by subtracting the mean value on each axis to create zero mean accelerometer signals;
    determining an estimate of a pitch angle and a roll angle using the mean value of the accelerometer data on each axis; and
    rotating the zero mean accelerometer signals to an X-Y plane by using the estimated pitch angle and the estimated roll angle and, while the vehicle is driven for a driving event period, detecting an acceleration/deceleration driving event period based on an amplitude of acceleration in the X-Y plane.

16. The non-transitory computer readable storage medium of claim 15, wherein the multiple axis accelerometer data is 3-axis accelerometer data.

17. The non-transitory computer readable storage medium of claim 15, wherein the converting the accelerometer data to zero mean signals is performed by using an integration estimate of the mean for an integration period of a predefined period of several seconds.

18. The non-transitory computer readable storage medium of claim 15, wherein the driving event period is a predefined number of minutes.

19. The non-transitory computer readable storage medium of claim 15, wherein the processor is further configured to perform:
   comparing the amplitude of acceleration in the X-Y plane to a predetermined threshold to detect the acceleration/deceleration event; and
   if the acceleration/deceleration event is confirmed then determining whether the event is a forward acceleration event or a forward deceleration event.

20. The non-transitory computer readable storage medium of claim 19, wherein if the event is a forward deceleration event then a sign change is applied to both X and Y components of acceleration in the X-Y plane, and wherein the processor is further configured to perform accumulating a plurality of X and Y components of acceleration in the X-Y plane over a plurality of samples and a plurality of driving events, estimating a yaw angle using a four-quadrant arctangent function based on the accumulated X and Y acceleration components, and rotating the zero-mean accelerometer signals into the X Y and Z coordinates of the vehicle using the estimated pitch, roll and yaw angles.

* * * * *